Figure 3:
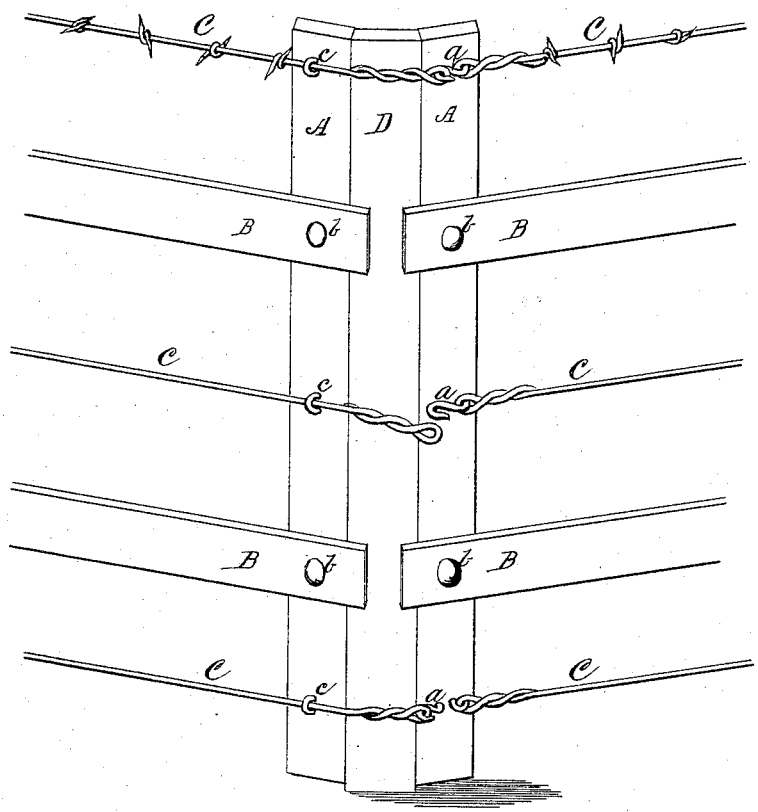

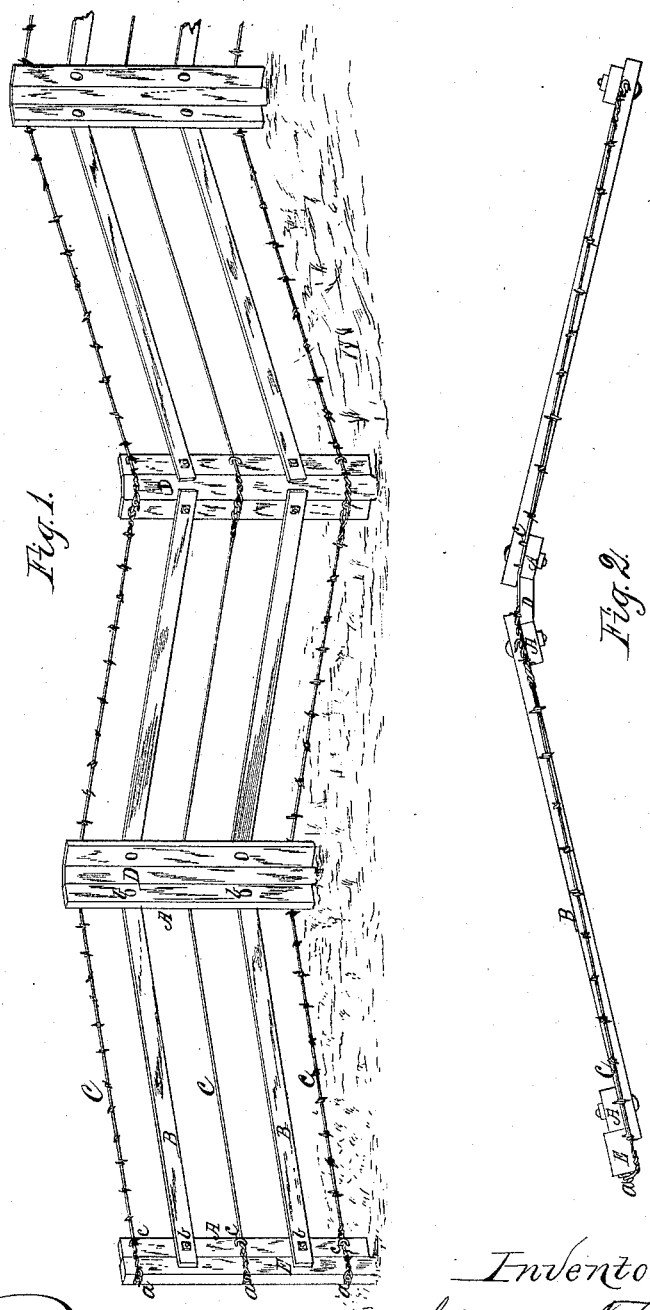

(No Model.) 2 Sheets—Sheet 2.

G. T. BALE.
PORTABLE FENCE.

No. 324,801. Patented Aug. 25, 1885.

UNITED STATES PATENT OFFICE.

GEORGE T. BALE, OF TAMA CITY, IOWA.

PORTABLE FENCE.

SPECIFICATION forming part of Letters Patent No. 324,801, dated August 25, 1885.

Application filed January 20, 1885. (No model.)

*To all whom it may concern:*

Be it known that I, GEORGE T. BALE, a citizen of the United States, residing at Tama City, in the county of Tama and State of Iowa, have invented certain new and useful Improvements in Portable Fences, of which the following is a specification.

The object of my invention is to produce a neat, strong, durable, cheap, and effective fence that may be quickly and easily moved from one place to another.

The invention consists in a series of sections of fence composed of end posts and one or more horizontal bars pivotally connected therewith, and one or more horizontal wires fastened securely to one post and loosely to the other, and adapted to connect with the adjoining post of the next section, and be drawn taut around a stake driven between the respective sections set at angles to each other, as will be hereinafter more fully set forth.

In the accompanying drawings, forming a part of this specification, Figure 1 represents a perspective view of a portion of fence; Fig. 2, a plan view of the same, and Fig. 3 an enlarged sectional elevation showing in detail the manner of connecting the sections or panels of fence.

The fence is made in sections of a convenient length to be easily portable.

To a post or upright, A, are fastened one or more horizontal bars, B, by means of bolts *b b*, or equivalent device.

In order that the sections may rock at various angles, according to the surface of the ground, the parts should be connected by a single bolt at each point of contact, which bolt serves as a pivot, and admits of the necessary variation. One horizontal bar may be sufficient; but in practice I prefer two, as represented. At about equal distances from these bars are strung the wires C C, which are fastened securely to one post by means of the hook *a*, having a suitable tang for that purpose, passing through a loop in the end of the wire. The other end passes through a staple, *c*, in the other post and on the opposite side thereof, and is also formed into a loop at some distance beyond the post. The sections are exact duplicates, and are connected by placing the loops of the loose ends of the wires over the hooks on the adjoining section. In their normal condition the wires are loose; but a stake, D, is driven into the ground between the ends of the respective sections, and the wires passing around this stake are strained tightly by setting the sections at an angle, as shown. These angles in a line fence alternate, as in Fig. 1; but in making small inclosures—such as pens or in fencing in hay-stacks—the bars and wires may be on the same side of both posts, and the angles accordingly all in one general direction. The stake D has parallel sides, and to give a good bearing for the uprights A A is preferably beveled at the edges to correspond with the angle of the sections. It is obvious, however, that a square or round stake may be made to answer the purpose. The horizontal bars may extend past the uprights and bear against the outside of the stake, as shown, thereby materially aiding the wires in strengthening and supporting the fence. One wire in connection with two or more bars will thus keep the fence in position, though for the sake of greater strength and security two or more are desirable. The terminal post E is similar to the intermediate stakes, except that it should be somewhat larger, and is supplied with hooks, to which the wire loops of the adjacent section are attached. The slack is taken up in the same manner as in the case of the intermediate sections.

The fence so constructed is easily and quickly set up and conveniently removed. The effect of its peculiar construction is to thoroughly bind and truss the whole line of fence, giving it special stiffness and strength, though built, as it may be, of comparatively light material. In consequence of its serpentine form it is not easily overturned, and the stakes need not therefore be driven far into the ground, so that they are easily set and taken up. The fence is particularly adapted to stock-farms where it is desirable to confine the stock within certain limits and change the pasture-ground from time to time. In it are combined the stock-repelling qualities of the common barb-wire fence without its dangerous character, as the bars render it so visible that no animal need run afoul of it. As indicated above, it may be made of light material, is easily and cheaply built and transported from place to place, and when set up occupies a comparatively narrow space, and presents a neat and satisfactory appearance.

Having thus described my invention, what I claim as new, and desire to secure by Letters Patent, is—

1. In a portable fence, a section or panel consisting of two terminal uprights, one of them provided with lateral hooks, one or more horizontal bars pivotally connected with said uprights, and one or more horizontal wires fastened securely to the upright having the hooks and loosely to the other, and having loops at the loose end adapted to engage with the hooks on the adjoining panel, substantially as set forth.

2. In a fence, the combination of stakes D and sections or panels consisting of uprights A A, one of them provided with hooks $a\ a$, horizontal bars B B, horizontal wires C C, one end extending beyond the uprights and having a loop adapted to engage with the hook on the upright of the adjoining panel, substantially as and for the purpose set forth.

In testimony whereof I affix my signature in presence of two witnesses.

GEORGE T. BALE.

Witnesses:
LEWIS T. WILCOX,
G. L. BENNETT.